United States Patent
Evans et al.

(10) Patent No.: US 6,807,665 B2
(45) Date of Patent: Oct. 19, 2004

(54) EFFICIENT DATA TRANSFER DURING COMPUTING SYSTEM MANUFACTURING AND INSTALLATION

(75) Inventors: Tracy J Evans, Albany, OR (US); Dale R Magnuson, Albany, OR (US); Derek J Whiteside, Albany, OR (US); Susan L Wechsler, Corvallis, OR (US); Tracy A Lang, Corvallis, OR (US); Richard Hollon, Jr., Half Moon Bay, CA (US); Daniel L Severns, Independence, OR (US); Mammie C Lee, Corvallis, OR (US)

(73) Assignee: Hewlett-Packard Development Company, L. P., Houston, TX (US)

(*) Notice: Subject to any disclaimer, the term of this patent is extended or adjusted under 35 U.S.C. 154(b) by 681 days.

(21) Appl. No.: 09/766,007

(22) Filed: Jan. 18, 2001

(65) Prior Publication Data

US 2002/0095672 A1 Jul. 18, 2002

(51) Int. Cl.[7] .............................................. G06F 9/445
(52) U.S. Cl. ...................................................... 717/175
(58) Field of Search ............................... 717/168, 172, 717/174, 178

(56) References Cited

U.S. PATENT DOCUMENTS

| 5,325,532 | A | * | 6/1994 | Crosswy et al. ................ 713/2 |
| 5,974,567 | A | * | 10/1999 | Dickson et al. ................ 714/27 |
| 6,038,399 | A | * | 3/2000 | Fisher et al. ................ 717/178 |
| 6,080,207 | A | | 6/2000 | Kroening et al. ........... 717/124 |
| 6,247,128 | B1 | * | 6/2001 | Fisher et al. ................ 713/100 |
| 6,470,446 | B1 | * | 10/2002 | Beelitz et al. ................ 713/2 |
| 6,519,762 | B1 | * | 2/2003 | Colligan et al. ............ 717/170 |
| 6,532,535 | B1 | * | 3/2003 | Maffezzoni et al. ........... 713/1 |

OTHER PUBLICATIONS

"Focus On OpenView A Guide to Hewlett–Packard's Network and System Management Platform", Nathan J. Muller, 1995, pp. 1–291.*
Email from Feb. 16, 2002 from, HP Instant Support, on How to use Hidden Sector for Recovery of Bundled Software, 1 page.*

* cited by examiner

*Primary Examiner*—Todd Ingberg

(57) ABSTRACT

A manufacturer installs software by first partitioning storage media of the computing system into a first partition and a second partition. The manufacturer installs software bundles Into the second partition. Each software bundle is stored in form as an image. The manufacturer also installs bootable software and a user interface into the first partition. The bootable software and the user interface when run, operate to receive from a user a selection as to which of the software bundles to install in the computing system. The software bundle selected by the user is installed into the first partition while overwriting the bootable software and the user interface. After installation of the software bundle selected by the user, the bootable software, for example, can erase the installation software bundles in the second partition. This is done, for example, by overwriting the second partition with a blank file system.

7 Claims, 4 Drawing Sheets

EFFICIENT DATA TRANSFER DURING COMPUTING SYSTEM MANUFACTURING AND INSTALLATION

BACKGROUND

The present invention concerns efficient data transfer and pertains particularly to efficient data transfer during computing system manufacturing and installation.

During the manufacture of a computing system, computer software is often pre-loaded into a storage device of the computer. For example the software is loaded into a hard disk storage device.

Downloading data into a storage device can take a significant amount of time. For example, currently 600 megabytes or more of software may be loaded into a typical computing system and the trend is towards an increasing amount of software. Using local area network (LAN) based data transfer, it can take a significant amount of time to download and install the necessary files into a computing system.

Increasingly, to limit the amount of time required to prepare a computing system, image-based data transfer is used. In image-based data transfer, individual files are ignored. Instead, the entire contents of a storage medium (such as a floppy disk, a CD ROM, a hard disk or a hard disk partition) is overwritten with an image. The image is taken after the operating system and other software have been installed on the system.

For example, Norton Ghost, available from Symantec Corporation having a business address of 10201 Torre Avenue, Cupertino, Calif. 95014-2128, creates an exact image of a hard disk. This is effectively a "snapshot" of all the files of the hard disk, even those that are hidden. These files include all the files that together set out the operating system, applications, and configuration settings. The snap shot image can be transferred to any other hard drive (or partition of a hard drive), CD ROM or other storage device. This allows simple creation of completely identical software installations. Copying in this way to computing systems can reduce the time required for operating system setup of each computing system by 90% or more.

One problem with using image-based data transfer is that updating even one file requires regeneration of the entire image. This can be a problem when the manufacturing site where software is installed is geographically distant from the location where software development occurs. For example, retransmission of 500 megabytes over thousands of miles can be both time-consuming as well as introducing uncertainty as to data integrity after the transfer.

Additionally, image-based data transfer significantly limits flexibility in varying the contents of installed software. A user may desire a computer installed with applications software that is targeted towards a particular use. Additionally, operating system software installed on a computing system may require different sets of hardware drivers depending upon the hardware within the computing system. Image-based data transfer allows very little flexibility in installing software for a variety of uses.

SUMMARY OF THE INVENTION

In accordance with the preferred embodiments of the present invention software installation is performed into computing systems. Software to be installed is transferred from a software provider to a manufacturer. The operating system software is transferred in image-based format. Hardware specific software is transferred in file-based format. The manufacturer installs the software into the computing systems.

In one preferred embodiment, the operating system software is installed into the computing systems using image-based format data transfer. The hardware specific software is installed into the computing systems using file-based format data transfer. For example, application software is included in an image that includes the operating system software, or is transferred along with the hardware specific software.

In various embodiments of the invention, multiple operating system software bundles are transferred to the manufacturer. Each multiple operating system software bundle is, for example, in image-based format. Multiple hardware specific software bundles also can be transferred to the manufacturer. The manufacturer selects which of the multiple operating system bundles and which of the hardware specific software bundles to install into each computing system. The manufacturer installs the selected software bundles into the computing systems. In these embodiments of the invention, the multiple hardware specific bundles may be transferred, for example, in file-based format. Also, multiple application software bundles can be transferred to the manufacturer. The manufacturer, for example, selects which of the multiple application software bundles to install into each computing system.

In alternative embodiments of the present invention, the manufacturer installs software by first partitioning storage media of the computing system into a first partition and a second partition. The manufacturer installs software bundles into the second partition. Each software bundle is stored in form as an image. The manufacturer also installs bootable software and a user interface into the first partition. The bootable software and the user interface, when run, operate to receive from a user a selection as to which of the software bundles to install in the computing system. The software bundle selected by the user is installed into the first partition while overwriting the bootable software and the user interface. After installation of the software bundle selected by the user, the bootable software, for example, erases the installation software bundles in the second partition. This is done, for example, by overwriting the second partition with a blank file system.

DESCRIPTION OF THE PREFERRED EMBODIMENT

Figure 1:
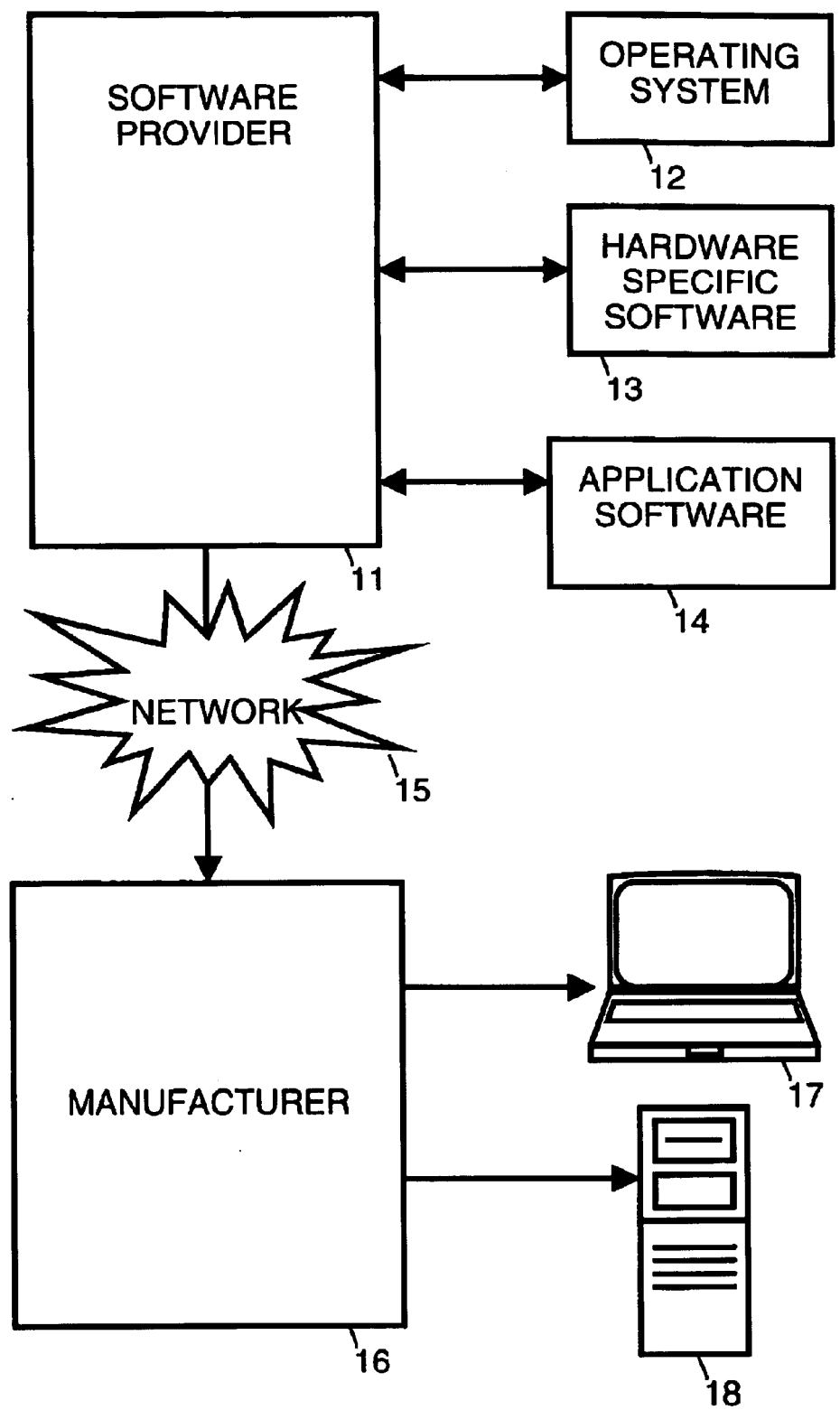
FIG. 1 shows a software provider generating software for computing systems at a location geographically distant from the location a manufacturer install software.

FIG. 1 illustrates a software provider 11 generating and maintaining software for inclusion in computing systems.

For example, the software includes operating system software 12, hardware specific software 13 and application software 14.

For example, operating system software 12 is Windows 98 operating system software, Windows 2000 operating system software, Windows NT operating system software or the Millennium operating system software, all available from Microsoft Corporation, having a business address of One Microsoft Way, Redmond, Wash. 98052. Alternatively, operating system software 12 is Linux, UNIX or any other available operating system.

For example, hardware specific software 13 includes software drivers for specific hardware platforms. In the preferred embodiment the different hardware platforms are various notebook computers available from Hewlett-Packard Company, having a business address of 3000 Hanover Street, Palo Alto, Calif., 94304.

For example, application software 14 are particular bundles of software application. For example, a first software bundle is for sales at retail outlets. A second software bundle is for sales to small and medium sized businesses. A third software bundle is for large businesses.

Software provider 11 is shown to be at a location geographically distance from a manufacturer 16 that performs the actual installation of software into computing systems represented by a notebook computer 17 and a desktop tower system 18. What is meant by software provider 11 is the entity that selects software to be installed on computing systems and provides the software to manufacturer 16.

Software provider 11 communicates to manufacturer 16 through a communication network 15. Communication network 15 is, for example, a private network, the phone system, the internet, or some other type of communication network.

Manufacturer 16 loads software into hard drives for the computing systems. This is done, for example using a hybrid approach where both image-based copying techniques and file-based copying techniques are utilized. Manufacturer 16 receives the images and files to be placed on the computing systems from software provider 11 through network 15, or by some other means.

For example, manufacturer 16 receives from software provider 11 an image for operating system software 12. Manufacturer 16 receives from software provider 11 files for hardware specific software 13. Hardware specific software 13 are smaller and less static components to be installed on the computing systems. When data within the files of hardware specific software 13 is changed, only the specific files need to be re-transferred from software provider 11 to manufacturer 16. Depending on the size and stability of application software 14, application software 14 can be combined with operating system software 12 in the image sent from software provider 11 to manufacturer 16 or can be sent from software provider 11 to manufacturer 16 in a file-based data transfer.

The hybrid approach described above allows for quick implementation of changes by software provider 11 while minimizing the impact of software download times from software provider 11 to manufacturer 16 and by manufacturer 16 into the computing systems.

In the above-described hybrid approach, it is not necessary for the manufacturer to do any manipulation of software files or images. The images and files are received from software provider 11 and downloaded into the computing systems. However there are circumstances where it is desirable for manufacturer 16 to have a limited amount of flexibility in arranging software before downloading software into the computing systems. For example, if a large order comes in from a non-targeted market segment, flexibility may be needed by manufacturer 16 to quickly fill the order.

In this case, one solution is to give manufacture 16 limited flexibility to build to customer order (BTCO). This is done, for example, by transferring to manufacturer 16 from software provider 11 image based (inert) packages for different operating systems. For example, manufacturer 16 stores inert packages for a first operating system 21, a second operating system 22, a third operating system 23 and a fourth operating system 24.

For example, operating system software 21, is Windows 98 operating system software available from Microsoft Corporation. Operating system software 22, is Windows 2000 operating system software available from Microsoft Corporation. Operating system software 23, is Windows NT operating system software available from Microsoft Corporation. Operating system software 24, is the Millennium operating system software available from Microsoft Corporation.

Manufacturer 16 also stores inert packages or file based packages for first hardware specific software 25, second hardware specific software 26, third hardware specific software 27 and fourth hardware specific software 28. For example, hardware specific software 25, hardware specific software 26, hardware specific software 27 and hardware specific software 28 include software drivers for various notebook computers available from Hewlett-Packard Company.

Manufacturer 16 additionally stores inert packages or file based packages for first application software 29, second application software 30 and third application software 31. For example, application software 29 is a software bundle for sales at retail outlets. Application software 30 is a software bundle for small and medium sized businesses. Application software 31 is a software bundle for large businesses.

When manufacturer 16 receives a build to customer order, manufacturer selects an operating system, hardware specific software and application software that fits the installation to be performed. When only the operating system software is image based, the operating system image is first copied onto a computing system. Then the individual files for the hardware specific software and/or the application software are downloaded to the computing system.

When the hardware specific software and/or the application software is image based, image for the operating system image is combined with the image(s) for the hardware specific software and/or the application software before or during downloading to the computing system.

Allowing manufacturer 16 the limited flexibility to fulfill build to customer orders allows manufacturer 16 a limited amount of flexibility without requiring a great deal of infrastructure or sophistication.

In an alternative embodiment of the present invention, multiple operating systems and/or application packages can be loaded into a computing system before shipment. At a first use, the user (customer) is allowed to select the desired configuration. This can be a particularly efficient way to, for example, allow a user to select a particular language (e.g., U.S. English or U.K. English) edition of an operating system.

Figure 3:
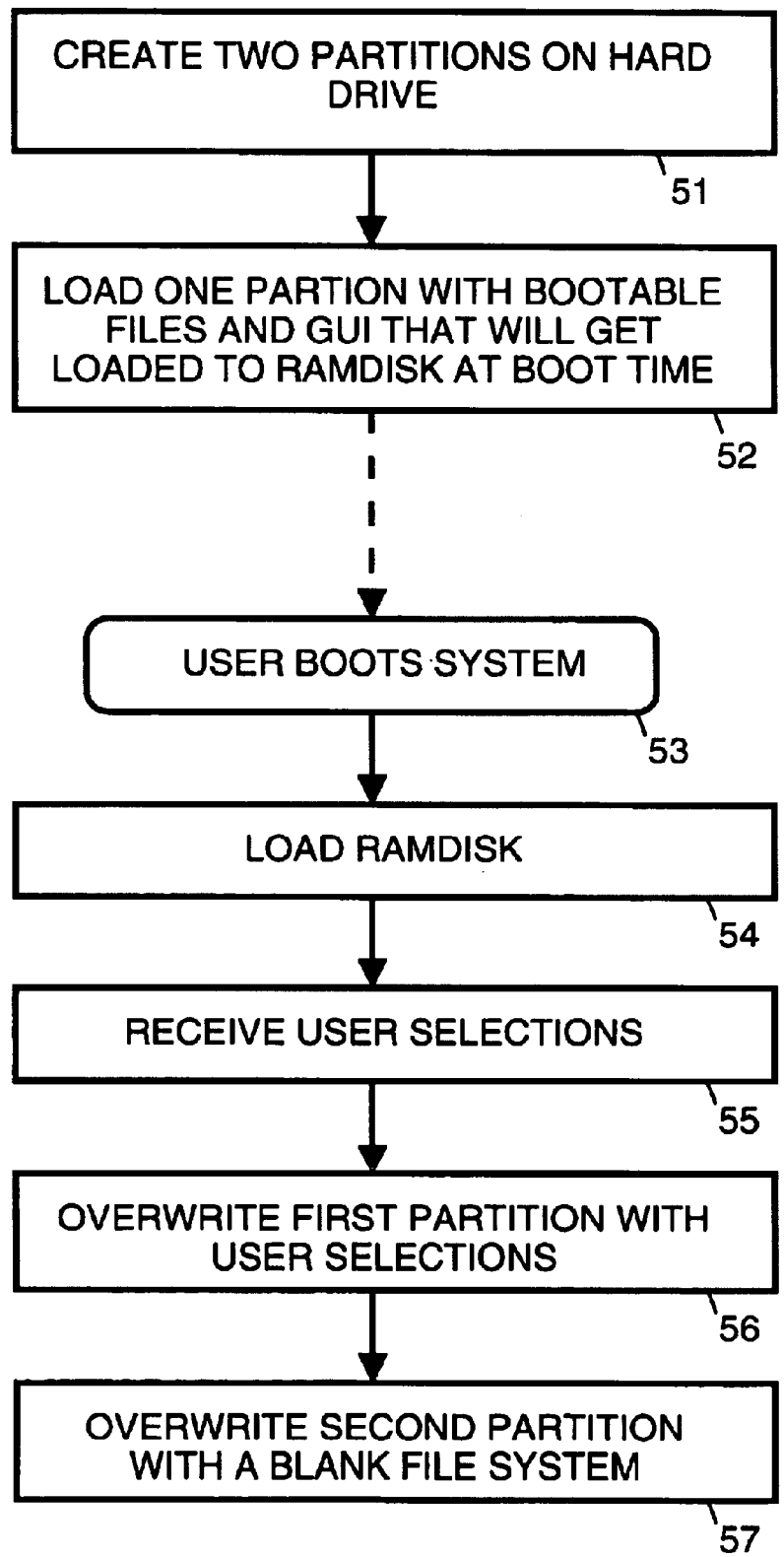
FIG. 3 is a flowchart that describes manufacture and use of a computing system that allows efficient installation and versatile installation by a user of desired software in accordance with a preferred embodiment of the present invention.
Figure 4:
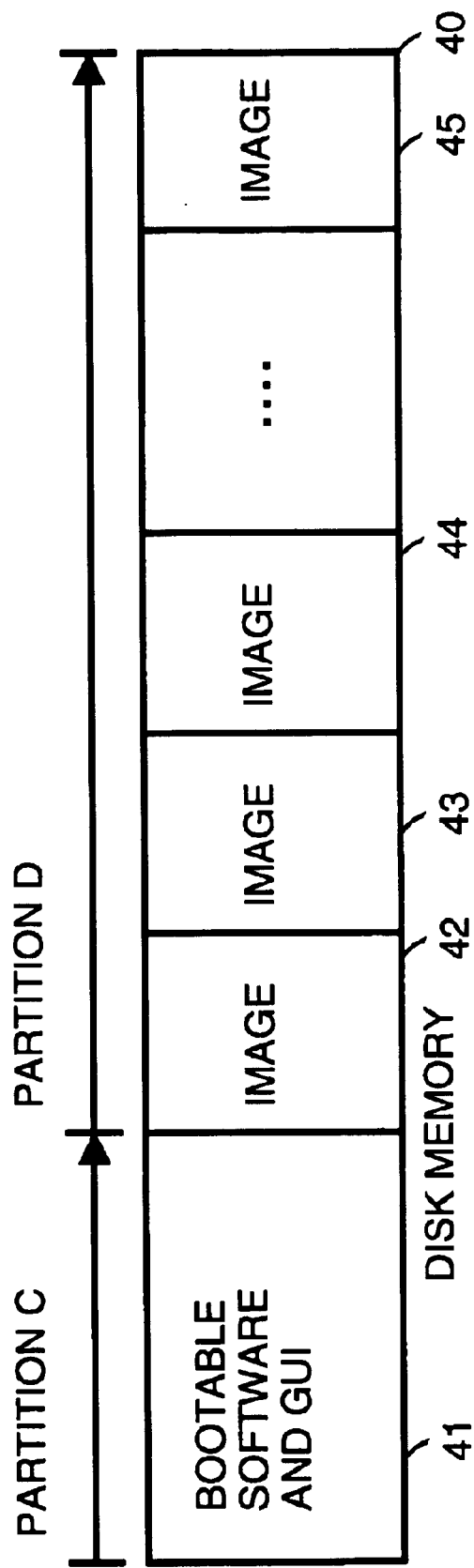
FIG. 4 illustrates memory organization of a storage device within a computing system that allows efficient and versatile installation of user desired software in accordance with a preferred embodiment of the present invention.

FIG. 3 is a flowchart that describes manufacture and use of a computing system that allows efficient installation and versatile installation by a user of desired software in accordance with a preferred embodiment of the present invention.

As illustrated by a step 51, manufacturer 16 creates two partitions on the hard drive of the computing system into which installation is to take place. For example, the computing system is notebook computer 17 shown in FIG. 1. The first partition is, for example, partition C and the second partition is, for example, partition D.

As illustrated by a step 52, manufacturer 16 loads the first partition (partition C) with bootable files and a graphical user interface (GUI) application. The bootable files and the graphical user interface get loaded to RAMDISK at boot time. Images selectable by the user are loaded into the second partition (partition D).

Figure 2:
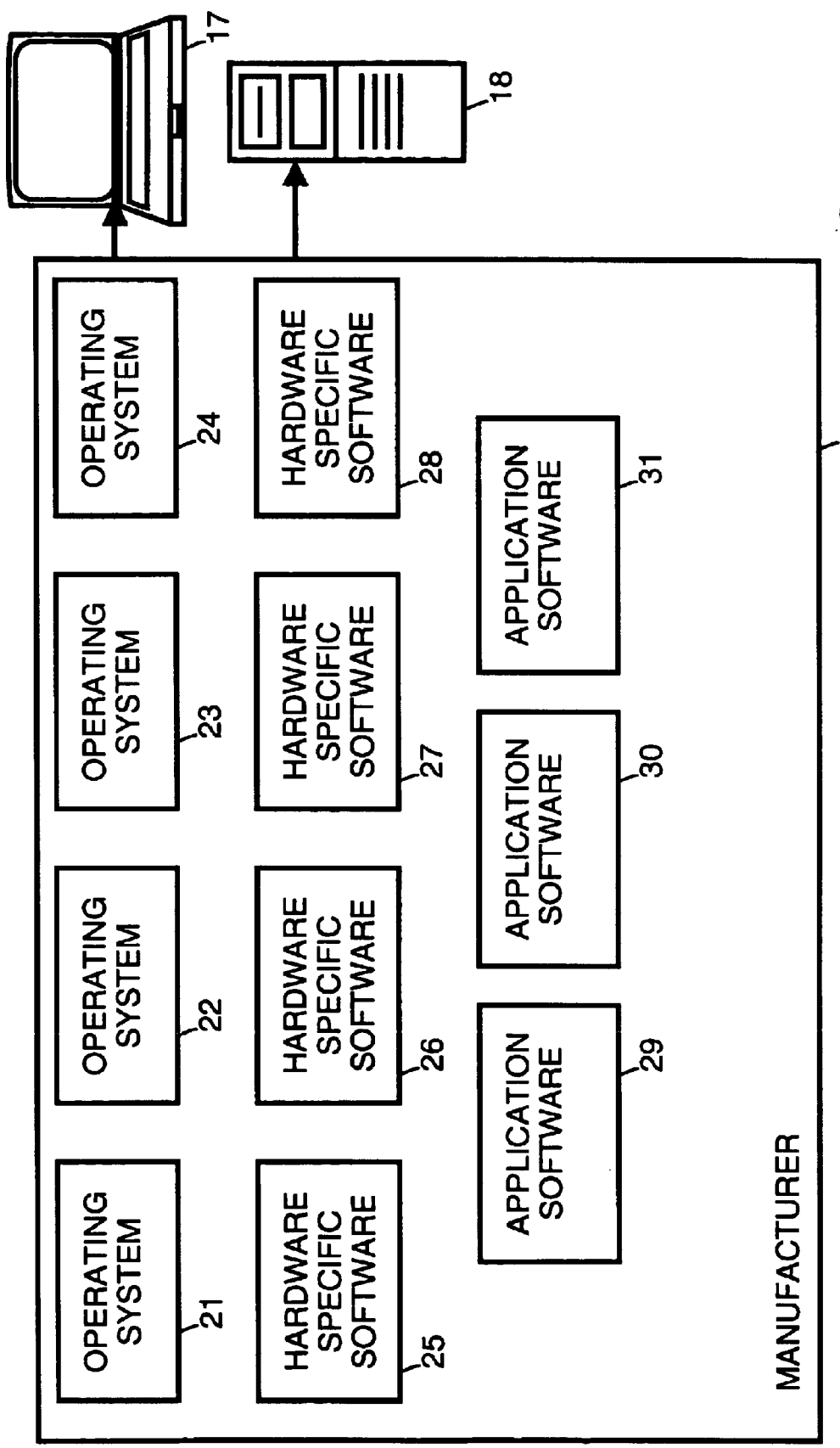
FIG. 2 illustrates a manufacturer having the ability to select multiple images to create installed software with versatility to accommodate installation of various operating systems, marketing segment software and platform specific software in accordance with a preferred embodiment of the present invention.

The resulting partitioning of disk drive memory 40 of notebook computer 17 is shown in FIG. 2. Software 41, including bootable software and a graphics user interface, is loaded into partition C. Various software images are loaded into partition D. For example, an image 42, an image 43, an image 44 and an image 45 are shown. Each image includes, for example, operating system software, hardware specific software and application software.

Notebook computer 17 is then shipped to a customer. In a step 53, the customer boots the system for the first time. In a step 54, notebook computer 17 loads a RAM disk 54 with the bootable files and the graphical user interface. In a step 55, notebook computer 17 receives the customer's instructions as to which operating system/application bundle is to be loaded onto notebook computer 17. In a step 56, notebook computer 17 overwrites the first partition (partition C) with the operating system/application bundle selected by the customer. In a step 57, notebook computer 17 overwrites the second partition (partition D) with a file system. For example, the file system is a blank fat 32 file system or a Windows NT file system (NTFS) a UNIX file system, or the file system for some other operating system. This leaves the customer with a fresh software load on the C partition and a clean D partition for user space.

One advantage of this method of installing a user selected operating system is that at the end of installation, partition C is not fragmented as generally results when for other types of dual language/dual operating system loads are performed. Also this process gives almost unlimited flexibility for the number of images that can be supported on the hard disk, limited only by the size of the D partition.

In an alternative embodiment, the user can be given additional flexibility to make selections. For example, manufacturer 16 can include additional applications in file based format. Any applications selected by the user can then be installed in remaining space of partition C after the image containing the selected operating system has been installed. Also, existing files can be updated and any unwanted files can be deleted.

Alternatively, rather than partitioning a hard drive, multiple images are stored on a compact disc read only memory (CD-ROM) or a digital video disc (DVD). A user selects which image to install on a computing system.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A manufacturing method, comprising:

(a) partitioning storage media of the computing system into a first partition and a second partition;

(b) installing software bundles into the second partition, each software bundle being stored in form as an image; and, (c) installing bootable software and a user interface application into the first partition, the bootable software and the user interface application, when run, being able to receive from a user a selection as to which of the software bundles to install in the computing system, and then to install a software bundle selected by the user into the first partition while overwriting the bootable software and the user interface application, and then to erase the software bundles in the second partition.

2. A method as in claim 1 wherein in (c) after installation of the software bundle selected by the user, the bootable software erases the installation-software bundles in the second partition by overwriting the second partition with a file system.

3. A computer comprising:

storage media of said computer partitioned into a first partition and a second partition;

wherein the second partition contains installation software bundles, each installation software bundle being stored in form as an image; and, wherein the first partition contains bootable software and a user interface application, the bootable software and the user interface application, when run, being able to receive from a user of said computer a selection as to which of the installation software bundles to install in the computing system, and then installing an installation software bundle selected by the user into the first partition while overwriting the bootable software and the user interface application and then erasing the installation software bundles in the second partition.

4. A computing system as in claim 3 wherein after installing the installation software bundle selected by the user into the first partition, the bootable software erases the installation software bundles in the second partition by overwriting the second partition with a File system.

5. A computer implemented method, comprising:

(a) upon starting a computer, running bootable software and a user interface application within a first partition of storage of the computer, the bootable software and a user interface application directing the computer to perform the following substeps:

(a.1) giving a user an opportunity to select for installation into the computer, one from a plurality of software bundles to install in the computer, each of the software bundles being stored in form as an image, each image being stored within a second partition of storage of the computer, (a.2) receiving a selection by the user; and, (a.3) installing a software bundle selected by the user into the first partition while overwriting the bootable software and the user interface.

6. A method as in claim 5 wherein step (a) additionally comprises the following substep:

(a.4) erasing the installation software bundles in the second partition.

7. A method as in claim 5 wherein step (a) additionally comprises the following substep:

(a.4) erasing the installation software bundles in the second partition by overwriting the second partition with a blank file system.

* * * * *